United States Patent
Dunne et al.

(10) Patent No.: US 9,473,486 B2
(45) Date of Patent: Oct. 18, 2016

(54) SINGLE SIGN ON AVAILABILITY

(71) Applicant: International Business Machines Corporation, Armonk, NY (US)

(72) Inventors: Jonathan Dunne, Dungarvan (IE); Jeremiah O'Connor, Roscommon (IE); Jeffrey B. Sloyer, Cary, NC (US); Ian D. Stewart, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/562,096

(22) Filed: Dec. 5, 2014

(65) Prior Publication Data
US 2016/0164860 A1    Jun. 9, 2016

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01)

(58) Field of Classification Search
CPC ............................ H04L 63/0815; G06F 21/41
See application file for complete search history.

(56) References Cited

U.S. PATENT DOCUMENTS

| | | | |
|---|---|---|---|
| 6,243,816 B1 * | 6/2001 | Fang ...................... | G06F 21/41 707/999.009 |
| 8,156,546 B2 * | 4/2012 | Varadarajan ............ | G06F 21/41 726/3 |
| 8,595,810 B1 * | 11/2013 | Ben Ayed ........... | H04L 63/0815 713/168 |
| 8,601,562 B2 * | 12/2013 | Milas ...................... | G06F 21/41 713/152 |
| 9,083,691 B2 * | 7/2015 | Banford ................ | H04L 67/145 |
| 2003/0163733 A1 * | 8/2003 | Barriga-Caceres ..... | G06F 21/33 726/5 |
| 2005/0015490 A1 * | 1/2005 | Saare ................... | H04L 63/0815 709/225 |
| 2011/0141974 A1 * | 6/2011 | Lieberman .......... | H04L 12/5895 370/328 |
| 2014/0259134 A1 * | 9/2014 | Scavo ................... | H04L 67/141 726/7 |
| 2014/0282971 A1 * | 9/2014 | Gustavson .............. | H04L 63/08 726/7 |

* cited by examiner

Primary Examiner — Kaveh Abrishamkar
Assistant Examiner — Thomas Ho
(74) Attorney, Agent, or Firm — Jordan IP Law, LLC

(57) ABSTRACT

Methods and computer program products relate to single sign on (SSO) availability including identifying a set of single sign on applications in a system in which a user authentication for a first application is used for other applications in the set of applications monitoring the set of applications to determine availability of single sign on for each application, and providing an indication of the availability of single sign on for each application.

15 Claims, 3 Drawing Sheets

| | Application A | Portal | Application B |
|---|---|---|---|
| Application A | //// | | //// |
| Portal | | //// | //// |
| Application B | //// | //// | //// |

SINGLE SIGN ON AVAILABILITY

BACKGROUND

Embodiments of the present invention generally relate to single sign on availability. More particularly, embodiments relate monitoring and remediating single sign on availability within a system.

With the growing use of multiple computer program products with a system, such as an integrated enterprise system, users increasingly desire seamless movement among the multiple computer program products without the need to re-enter their credentials, such as a login identification and password. One mechanism that may be used to facilitate seamless movement between disparate computer program products is the technology sometimes referred to as Single Sign On (SSO). Products integrated by Single Sign On may permit the user to enter credentials for a first computer program product and have these credentials shared with the other computer program products in the integrated system to automatically permit access without the need to re-enter credentials. Various factors, however, can affect SSO availability among computer program products. Typically, when SSO is not available between two computer program products, it is discovered by an end user who alerts a system administrator to diagnose and fix the connectivity problem. Such an approach may create user frustration and possible data loss as the user attempts to navigate to a computer program product with an interruption in SSO connectivity.

BRIEF SUMMARY

Embodiments may include a computer program product to identify single sign on (SSO) availability, the computer program product comprising a computer readable storage medium having program instructions embodied therewith, the program instructions executable by a computer to cause the computer to monitor a status of single sign on availability for plural applications within a system and provide an indication of the availability of single sign on for each application.

Embodiments may also include a method to identify single sign on (SSO) availability including identifying a set of single sign on applications in a system in which a user authentication for a first application is used for other applications in the set of applications monitoring the set of applications to determine availability of single sign on for each application, and providing an indication of the availability of single sign on for each application.

Embodiments may also include a computer program product to identify single sign on (SSO) availability within a system, the computer program product comprising a computer readable storage medium having program instructions embodied therewith, the program instructions executable by a computer to cause the computer to identify a set of single sign on applications in a system in which a user authentication for a first application is used for other applications in the set of applications, monitor the set of applications to determine availability of single sign on for each application, and provide an indication of the availability of single sign on for each application.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figures 1A, 1B:
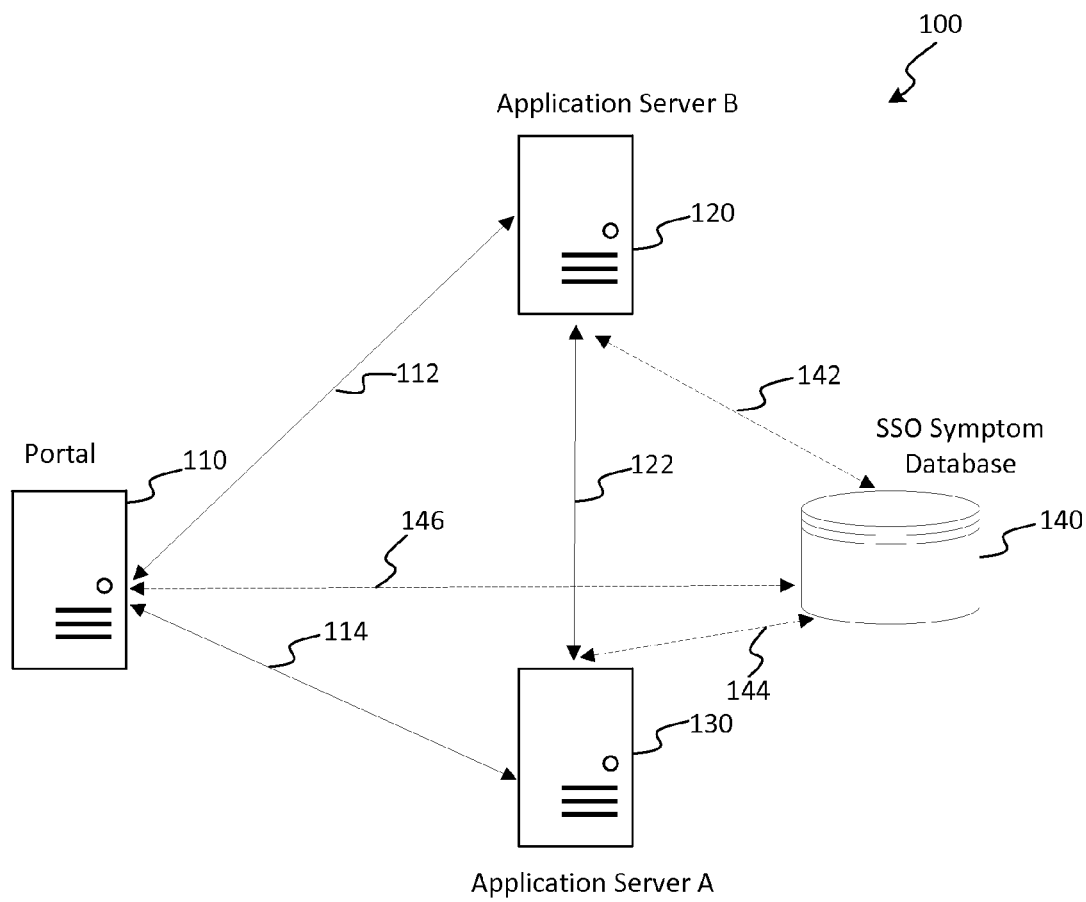
FIG. 1A is a block diagram of an example single sign on system according to an embodiment.
FIG. 1B is an illustration of an example of a visual indicator for the single sign on system of FIG. 1A.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1A, a system 100 having single sign on capability is depicted. In an embodiment, the system 100 may be an integrated enterprise environment. In the system 100 a user may authenticate to a particular application on an application server B 120 through a portal 110 by providing credentials such as a user ID and password. Using these credentials, the user may be authenticated to the application residing on the application server B 120 through a pathway 112. The illustrated application server B 120 communicates with an application server A 130 through a pathway 122 to share the authentication credentials of the user. In order to access to an application residing on the application server A 130, the user may make a request for resources through a pathway 114. Because single sign on is available in the system 100, the user need not re-enter authentication credentials in order to access the application residing on the server A 130. That is, the user is already authenticated to the application residing on the application server A 130, in the illustrated example.

The system 100 may also include a single sign on (SSO) symptom database 140 that includes various features. For example, the single sign on symptom database 140 may be populated with the knowledge of the system 100 configuration details to ensure successful single server sign on and the system execution processes required to validate single sign on. SSO configuration summary data may be persisted in the database 140 such that this knowledge could be polled to determine SSO status within the system. Although not shown, the database 140 could exist on a computer, a server, an application server, or any other host that can execute the various features of the database 140. In one aspect, the database 140 includes a monitoring agent that validates the SSO pathways such as by monitoring the SSO endpoints within the system 100. The term "agent" as used herein, may relate to a software entity that is goal-oriented and persistent and, without requiring input from or interaction with a user, can oversee other programs or applications. Thus, without continuous direction supervision, an agent can perform a function within a network. Here, the software agent performs a monitoring function and, as discussed below, can optionally perform a remediation function.

The dashed lines in FIG. 1A indicate monitoring pathways for the agent. Thus, a pathway 144 may enable monitoring of the SSO endpoint in the application server A 130, while a pathway 142 may enable monitoring of the SSO endpoint in the application server B 120. An illustrated pathway 146 enables monitoring of the status of the SSO endpoints in the portal 110.

When all of the SSO endpoints are viable and all the applications with SSO capability are working properly and permitting single sign on authentication, a visual indicator 200 may be displayed to a user or system administrator as seen in FIG. 1B. The various boxes indicating interconnection among the applications are filled in; for quick identification, a color such as green may indicate that all the paths are operational. Thus, when a user initially signs on, the visual indicator may be displayed in the form of a dashboard, informing the user that all the applications may be accessed via the single sign on feature. Note that any visual indicator of status may be used in the single sign on system of this embodiment or related embodiments.

Figures 2A, 2B:
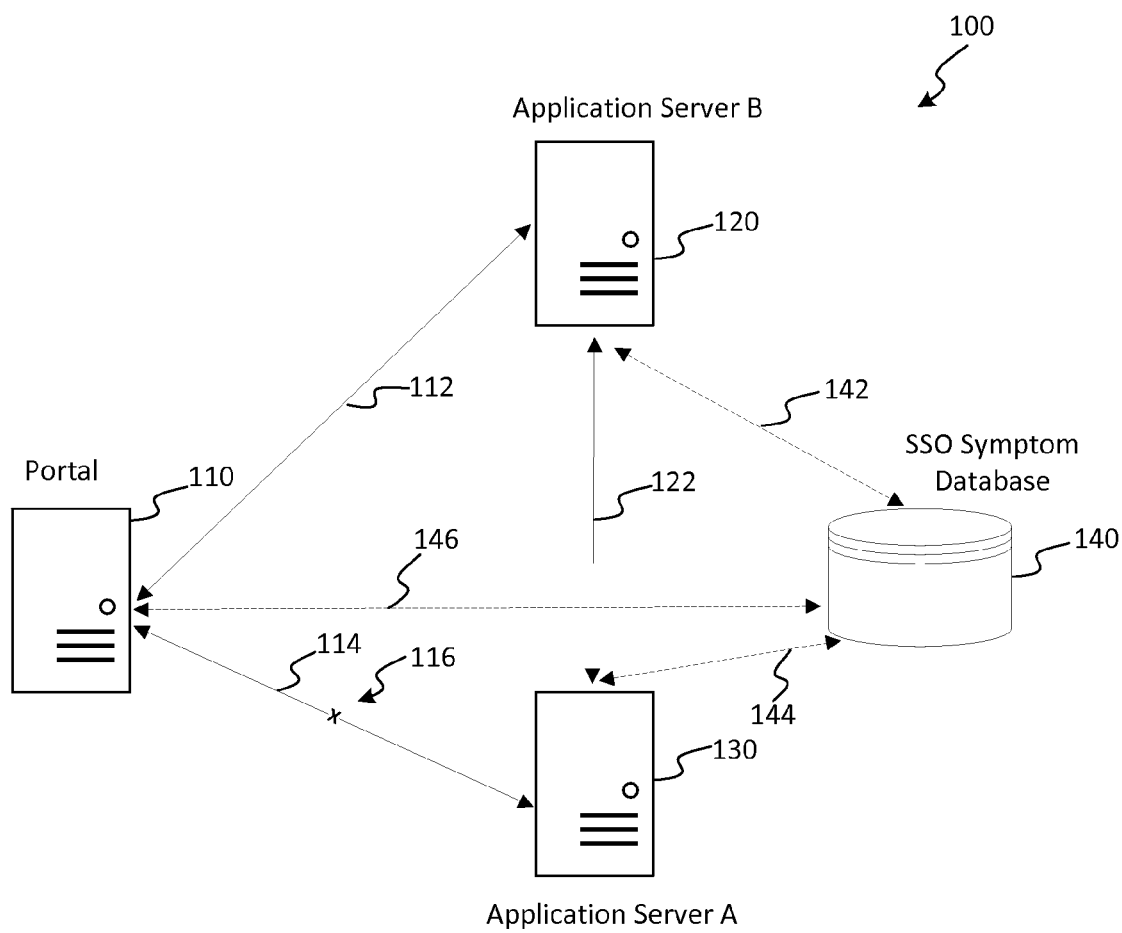
FIG. 2A is a block diagram of an example of the single sign on system of FIG. 1A with an interruption in availability.
FIG. 2B is an illustration of an example of a visual indicator for the single sign on system of FIG. 2A

Turning to FIG. 2A, an interruption in single sign on capability has occurred between the portal 110 and the application server A 130 as indicated by the "x" 116 in the pathway 114. With single sign on interrupted, the user authentication to the application server B would not be sufficient to gain access to the application on the application server A 130. The software agent from the SSO symptom database 140 may monitor this interruption of service in real time and the visual indicator 200 of FIG. 2B is displayed showing that the connection between the portal 110 and an application A on the application server A 130 is down as well as the connection between the application A and the portal 110. Although shown as blank boxes in the visual indictor 200 of FIG. 2B, the boxes could be colored red to show an outage of service. When the user logs in and completes the authentication process, the user would be informed via the indicator 200 that the single sign on capability is interrupted for application A. With this knowledge, the user can attempt another way to access the application server A 130 or can avoid attempting to communicate with the application server A before entering data to be sent to the application server A 130.

The SSO symptom database 140 can optionally include various techniques for remediating an interruption in service. Through historical data relating to reasons for an interruption in service, fixes for the interruption can be provided. For example, if the clock on the portal 110 has drifted out of synchronization with the clock on the application server A 130, the agent may reset the clocks so that the single sign on link may be reestablished. As various fixes are determined, the data is maintained by the SSO symptom database 140. Examples of remediations that may be performed include clock synchronization, token import, key import, compatibility, naming, protocol, and access control list compatibility, etc. The data maintained in the SSO symptom database 140 may also be associated with an indication of the history of the fix with that particular server or portal so that an intelligent choice may be made for solutions to the interruption in service. In this manner, the collective knowledge of the remediations made in the system 100 is stored in the SSO symptom database 140. Further, the history of downtime in connectivity may also be recorded, providing a basis for determining compatibility of various applications in an SSO environment.

Figure 3:
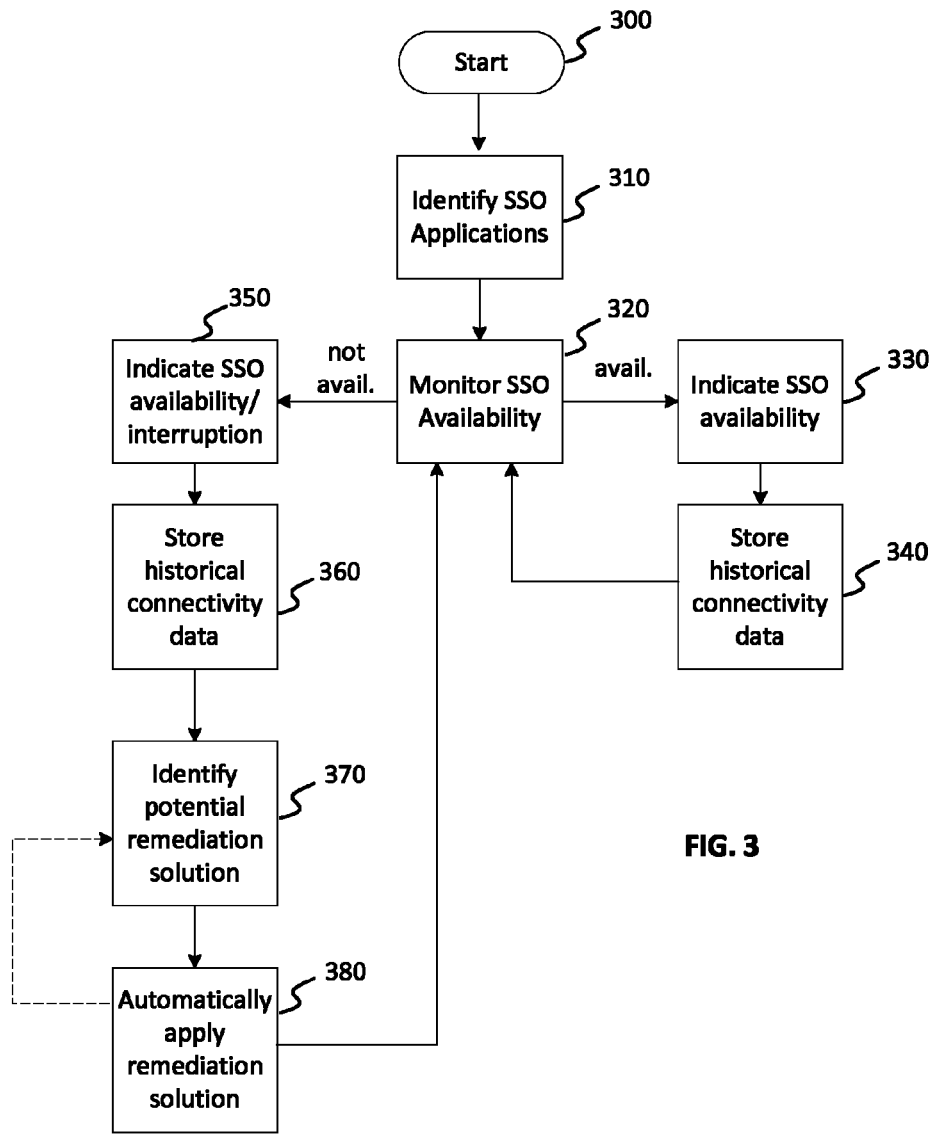
FIG. 3 is a flowchart of an example of a method of managing single sign on availability in a system according to an embodiment.

FIG. 3 depicts a flowchart of embodiments together with optional embodiments for SSO monitoring and optional remediation of SSO interruption. The block 300 represents the start while the block 310 depicts an optional identification of SSO applications in a system. In the block 320, the SSO availability of all the SSO-enabled applications is monitored. In one aspect, monitoring may take the form of monitoring factors affecting availability of single sign on such as clock synchronization.

If all the applications are available for SSO, then the status of the applications as available for SSO is indicated in the block 330. Optionally, this historical data of connectivity is stored in the SSO symptom database 140 at the block 340. As indicated by the arrow from the block 340 to the block 320, SSO availability continues to be monitored.

If there is at least one application for which SSO has been interrupted, that is, SSO is not available for that application, then an indicator that there is SSO interruption is made at the block 350 which may be a dashboard 200 as described above. Optionally, this historical data regarding SSO connectivity is stored in the SSO symptom database 140 at the block 360. Optionally, potential remediation solutions for an interruption in SSO availability are identified at the block 370.

The identification of potential remediation solutions may be made based on historical data of factors that cause SSO interruption from data in the SSO database 140. For example, the historical data may indicate that the particular SSO endpoint has a tendency to drift out of synchronization with a clock on another application server. Thus, a remediation solution that is automatically applied at block 380 would be to synchronize the clock that has drifted with a clock on another server. This solution is attempted without the intervention of the user or system administrator. Note that if the particular remediation solution does not work, the blocks 370 and 380 may be repeated until the SSO connectivity is restored. When a working solution is made, that data is recorded in SSO symptom database 140. As indicated by the arrow from the block 380 to the block 320, SSO availability continues to be monitored.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to identify single sign on (SSO) availability within a system, the computer program product comprising a computer readable storage medium having program instructions embodied therewith, the program instructions executable by a computer to cause the computer to:
    identify a set of single sign on applications in a system in which a user authentication for a first application is used for other applications in the set of applications;
    monitor the set of applications to determine availability of single sign on for each application;
    provide an indication of the availability of single sign on for each application; and
    restore single sign on capability to an application upon discovery of an application with an interruption of single sign on availability and create a database of solutions to restore single sign on capability upon restoration of single sign on availability to an application wherein the restoration of single sign on availability involves clock synchronization, token import, key import, compatibility, naming, protocol, and access control list compatibility.

2. The computer program product of claim 1, wherein the system is to be an integrated enterprise environment.

3. The computer program product of claim 1, wherein the program instructions are executable to cause the computer to create a database of historic single sign on connectivity data among the applications.

4. The computer program product of claim 1, wherein the program instructions are executable to display a visual dashboard of single sign on status for the applications to provide the indication of the availability of single sign on.

5. A method of identifying single sign on (SSO) availability comprising:
- identifying a set of single sign on applications in a system in which a user authentication for a first application is used for other applications in the set of applications;
- monitoring the set of applications to determine availability of single sign on for each application;
- providing an indication of the availability of single sign on for each application; and
- restoring single sign on capability to an application upon discovery of an application with an interruption of single sign on availability and creating a database of solutions to restore single sign on capability upon restoration of single sign on availability to an application wherein the restoration of single sign on availability involves clock synchronization, token import, key import, compatibility, naming, protocol, and access control list compatibility.

6. The method of claim 5, wherein the system is to be an integrated enterprise environment.

7. The method of claim 5, further comprising creating a database of historic single sign on connectivity data among the applications.

8. The method of claim 5, wherein providing an indication of the availability of single sign on for each application comprises displaying a visual dashboard of single sign on status for the applications.

9. A computer program product to identify single sign on (SSO) availability, the computer program product comprising a computer readable storage medium having program instructions embodied therewith, the program instructions executable by a computer to cause the computer to:
- monitor a status of single sign on availability for plural applications within a system;
- provide an indication of the availability of single sign on for each application; and
- restore single sign on capability to an application upon discovery of an application with an interruption of single sign on availability and create a database of solutions to restore single sign on capability upon restoration of single sign on availability to an application wherein the restoration of single sign on availability involves clock synchronization, token import, key import, compatibility, naming, protocol, and access control list compatibility.

10. The computer program product of claim 9, wherein the system is to be an integrated enterprise environment.

11. The computer program product of claim 9, wherein the program instructions are executable to cause the computer to monitor factors affecting availability of single sign on.

12. The computer program product of claim 9, wherein the program instructions are executable to cause the computer to create a database of historic single sign on connectivity data among the applications.

13. The computer program product of claim 9, wherein the program instructions are executable to display a visual dashboard of single sign on status for the applications to provide the indication of the availability of single sign on.

14. The computer program product of claim 13, wherein the program instructions are executable to cause the computer to provide a user interface having selectable entries to receive further detail regarding the single sign on status for the applications.

15. The computer product of claim 9, wherein the program instructions are executable to cause the computer to:
- store a history of monitoring factors affecting single sign on availability;
- analyze the history of monitoring factors to identify remediation solutions for an identified interrupted single sign on application;
- automatically apply the remediation solution to the identified interrupted single sign on application.

* * * * *